United States Patent
Latheef et al.

(10) Patent No.: US 12,108,459 B2
(45) Date of Patent: Oct. 1, 2024

(54) METHOD AND UE FOR REPORTING ACCESSIBILITY MEASUREMENT IN WIRELESS COMMUNICATION SYSTEM

(71) Applicant: Samsung Electronics Co., Ltd., Suwon-si (KR)

(72) Inventors: Fasil Abdul Latheef, Bangalore (IN); Mangesh Abhimanyu Ingale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/608,728

(22) PCT Filed: Apr. 29, 2020

(86) PCT No.: PCT/KR2020/005642
§ 371 (c)(1),
(2) Date: Nov. 3, 2021

(87) PCT Pub. No.: WO2020/226336
PCT Pub. Date: Nov. 12, 2020

(65) Prior Publication Data
US 2022/0322448 A1    Oct. 6, 2022

(30) Foreign Application Priority Data

May 3, 2019 (IN) .............................. 201941017815
Apr. 21, 2020 (IN) ............................. 201941017815

(51) Int. Cl.
*H04W 74/0833* (2024.01)
*H04B 7/06* (2006.01)
(Continued)

(52) U.S. Cl.
CPC ...... *H04W 74/0833* (2013.01); *H04B 7/0695* (2013.01); *H04L 5/0053* (2013.01);
(Continued)

(58) Field of Classification Search
CPC ............. H04W 74/0833; H04W 76/18; H04W 74/002; H04B 7/0695; H04L 5/0053; H04L 5/0094
(Continued)

(56) References Cited

U.S. PATENT DOCUMENTS 8,694,003 B2    4/2014 Huang et al.
2014/0133465 A1   5/2014 Johansson et al.
(Continued)

FOREIGN PATENT DOCUMENTS

| EP | 2234450 A2 | 9/2010 |
|---|---|---|
| IN | 201817047839 A | 3/2019 |
| WO | 2014023817 A1 | 2/2014 |

OTHER PUBLICATIONS

MediaTek Inc., "Enhancements to Initial Access Procedure", 3GPP TSG RAN WG1 #96bis, Apr. 8-12, 2019, R1-1904483, 7 pages.
(Continued)

*Primary Examiner* — Nghi H Ly

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein disclose a method for reporting an accessibility measurement by a UE (100) based on a RRC connection establishment failure in a wireless communication system. The method includes detecting a RRC connection establishment failure and logging parameters selected while attempting the failed RRC connection establishment, wherein the logged parameters are referred as accessibility measurements. Further, the method includes indicating a presence of a connection establishment failure report to a base station (200) and reporting a connection establishment failure report to the base station (200), in response to receiving request from the base station (200), wherein the failure report
(Continued)

comprises accessibility measurements that comprise at least one of a SSB information selected during cell access and subsequently on which the UE encountered the RRC connection establishment failure and a uplink carrier information selected during cell access and subsequently on which the UE encountered the establishment failure.

16 Claims, 8 Drawing Sheets

(51) Int. Cl.
    *H04L 5/00*         (2006.01)
    *H04W 74/00*       (2009.01)
    *H04W 76/18*       (2018.01)

(52) U.S. Cl.
    CPC ......... *H04L 5/0094* (2013.01); *H04W 74/002* (2013.01); *H04W 76/18* (2018.02)

(58) Field of Classification Search
    USPC ................ 370/329, 328, 338, 341, 345, 350
    See application file for complete search history.

(56) References Cited

U.S. PATENT DOCUMENTS

| | | | |
|---|---|---|---|
| 2018/0302889 A1 | 10/2018 | Guo et al. | |
| 2019/0116585 A1 | 4/2019 | Chakraborty et al. | |
| 2019/0254064 A1* | 8/2019 | Islam | H04W 74/0883 |
| 2020/0196254 A1* | 6/2020 | Kerhuel | H04L 5/0048 |

OTHER PUBLICATIONS

CMCC, "Discussion on NR MDT accessibility information reporting", 3GPP T SG-RAN WG2 Meeting #106, May 13-17, 2019, R2-1905940, 9 pages.
Qualcomm Incorporated, "Remaining details on beam recovery procedure", 3GPP TSG RAN WG1 Meeting AH 1801, Jan. 22-26, 2018, R1-1800860, 9 pages.
Supplementary European Search Report dated Sep. 9, 2022 in connection with European Patent Application No. 20 80 2983, 12 pages.
Examination report dated Nov. 3, 2021, in connection with Indian Application No. 201941017815, 5 pages.
International Search Report and Written Opinion of the International Searching Authority dated Aug. 14, 2020, in connection with International Application No. PCT/KR2020/005642, 10 pages.
3GPP TS 38.321 V16.4.0 (Mar. 2021), Technical Specification, 3rd Generation Partnership Project; Technical Specification Group Radio Access Network; NR; Medium Access Control (MAC) protocol specification (Release 16), Mar. 2021, 157 pages.
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018, 4 pages.
CMCC, "Discussion on NR MDT accessibility information reporting," R2-1905940, 3GPP T SG-RAN WG2 Meeting #106, Reno, Nevada, USA, May 13-17, 2019, 9 pages.
RAN2, "RAN2 CRs to SON and MDT support for NR: Core part," RP-200354, 3GPP TSG-RAN Meeting #87, Online, Mar. 16-19, 2020, 1 page.
ZTE, "Enhancement on CEF Report," R2-1906529, 3GPP TSG-RAN WG2 Meeting #106, Reno, Nevada, USA, May 13-17, 2019, 4 pages.
The First Office Action dated Dec. 5, 2023, in connection with Chinese Application No. 202080033466.5, 18 pages.
Notice of Preliminary Rejection dated Jan. 22, 2024, in connection with Japanese Application No. 2021-565793, 7 pages.
Notice of Preliminary Rejection dated May 27, 2024, in connection with Japanese Application No. 2021-565793, 9 pages.
Communication pursuant to Article 94(3) EPC dated Jul. 11, 2024, in connection with European Application No. 20802983.5, 10 pages.
Qualcomm Incorporation, "Control Plane handling and procedures to support Make-Before-Break (MDD) Ho," R2-1903643, Revision of R2-1900358, 3GPP TSG-RAN WG2 Meeting #105bis, Xi-an, China, Apr. 8-12, 2019, 5 pages.
Samsung, "On Supporting Make-Before-Break in NR," R2-1905041 (Revision of R2-1900989), 3GPP TSG-RAN WG2 #105bis, Xi-an, China, Apr. 8-12, 2019, 2 pages.

* cited by examiner

[Fig. 1]
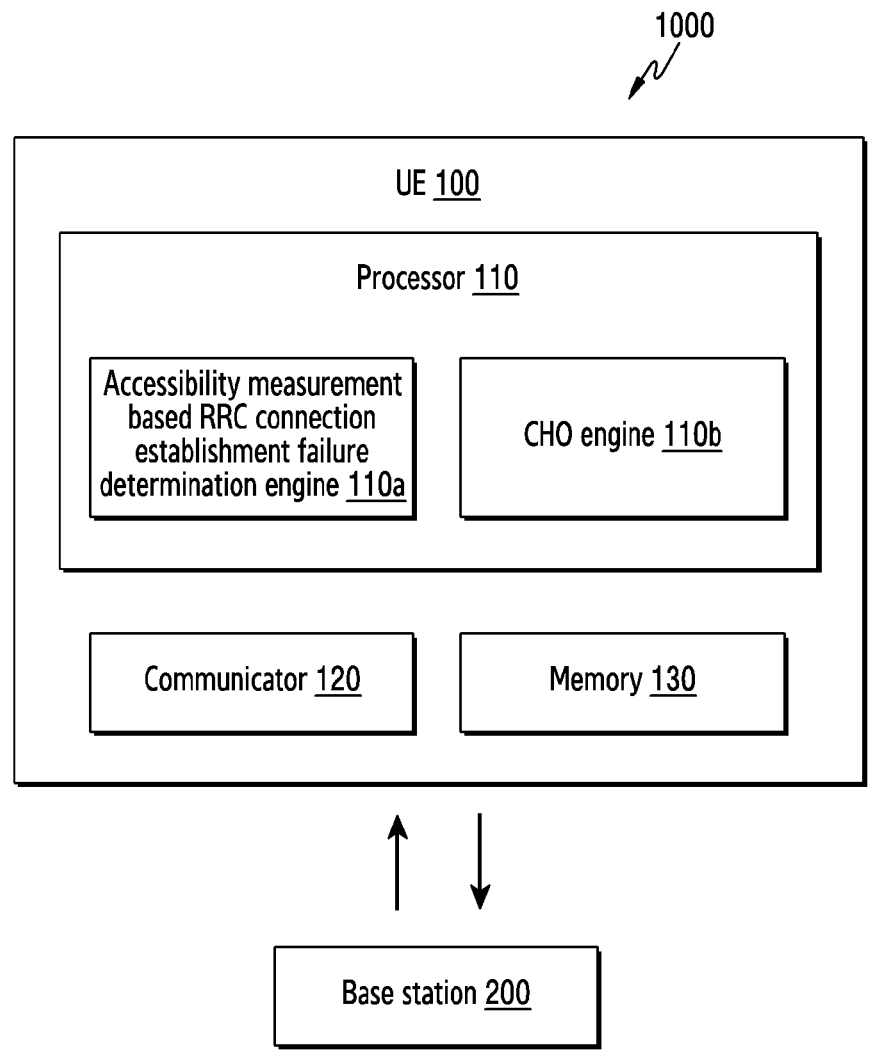

[Fig. 2A]
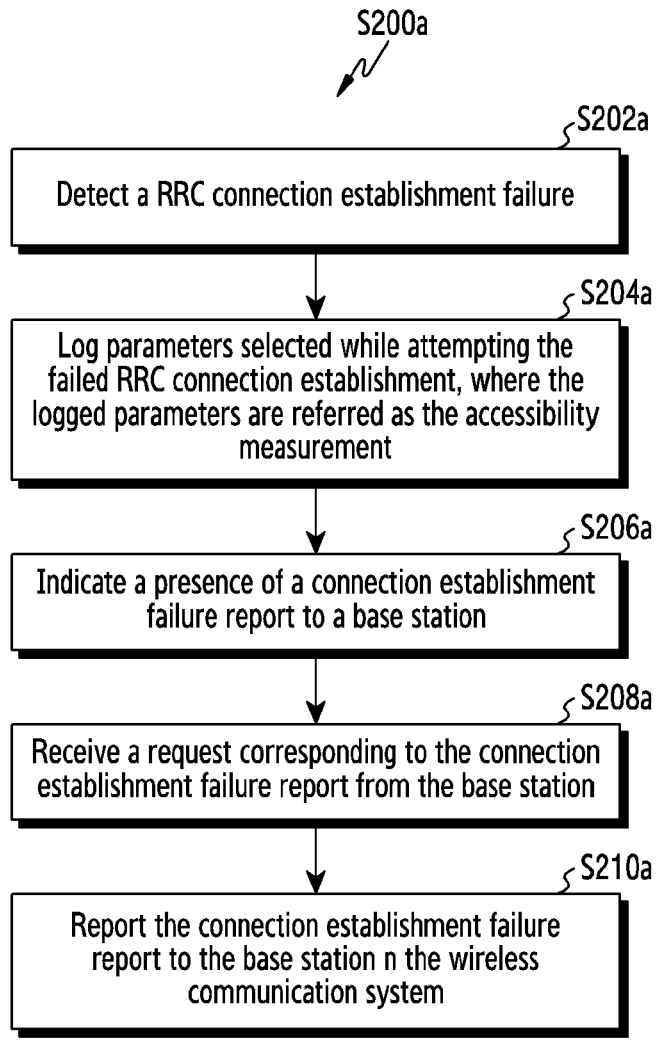

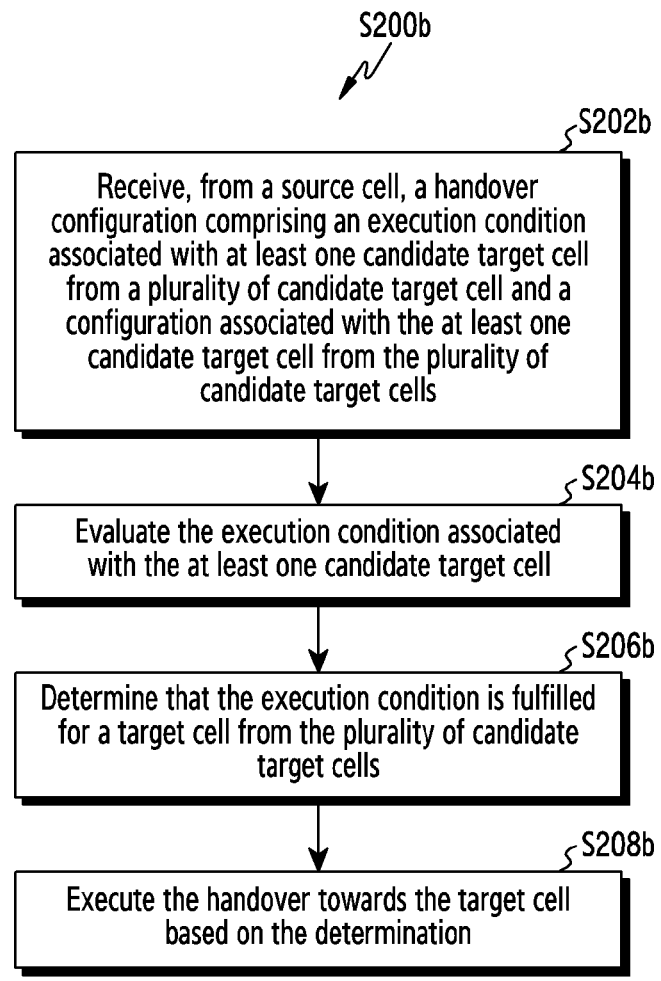

[Fig. 3A]
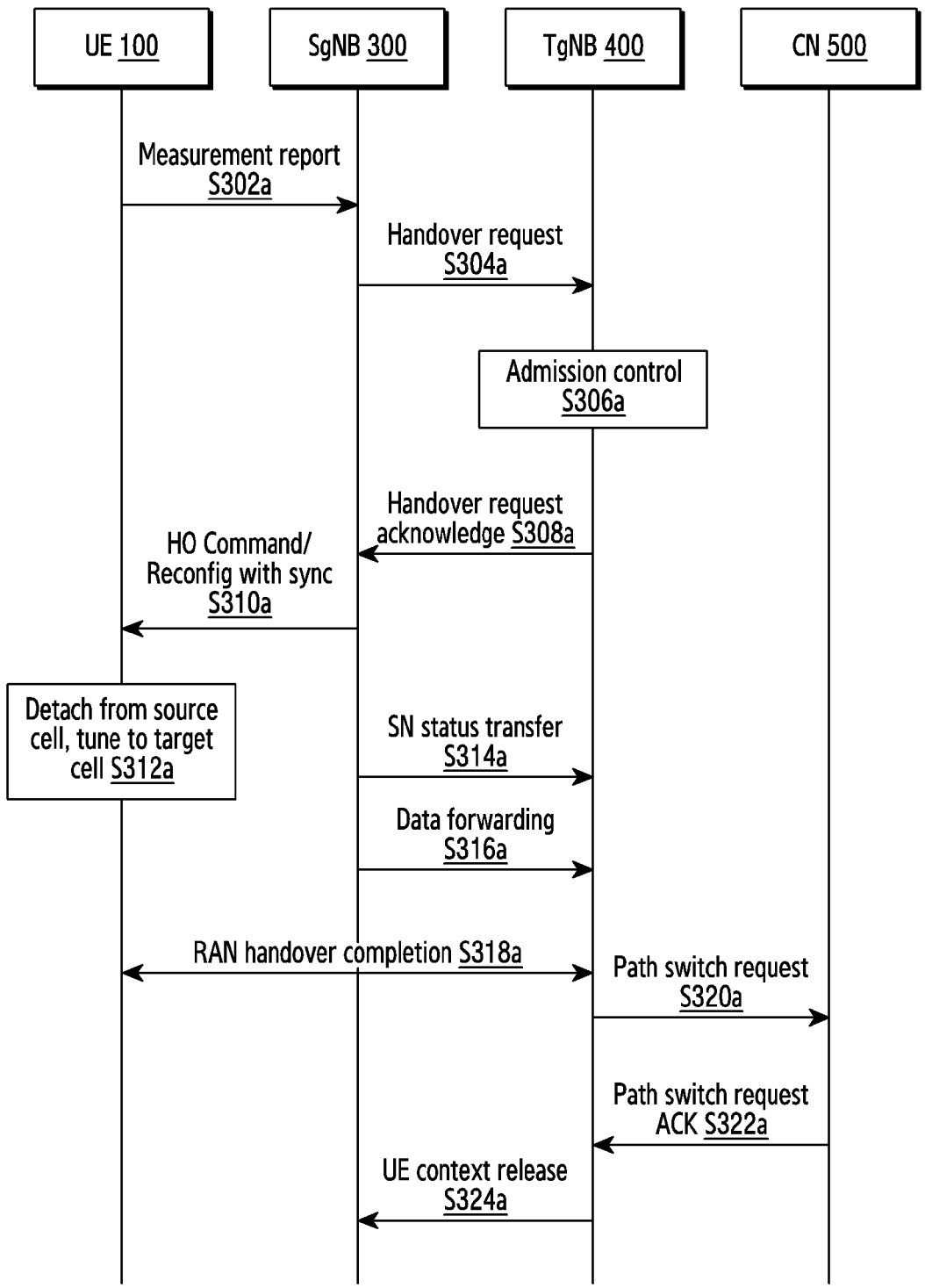

[Fig. 3B]
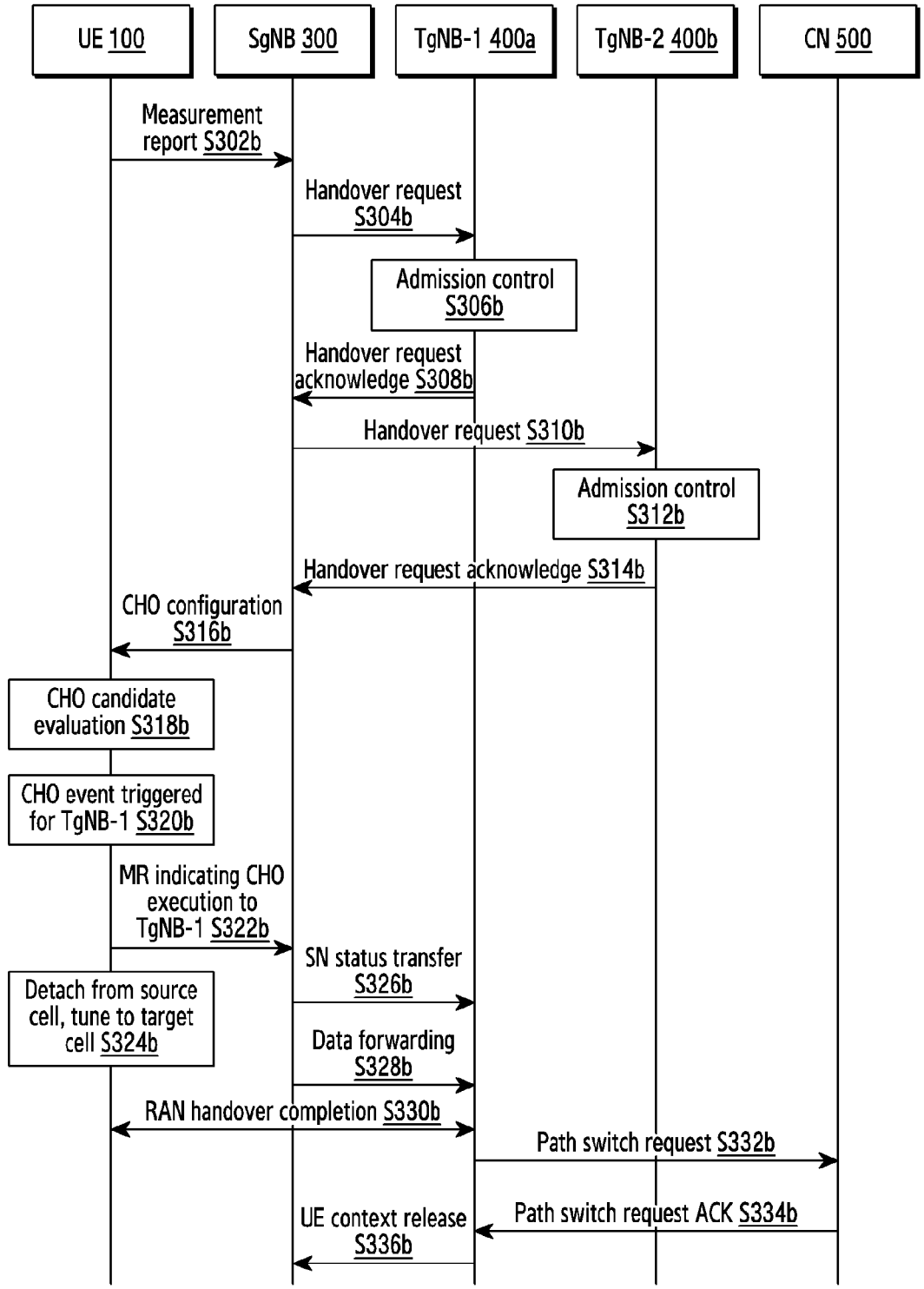

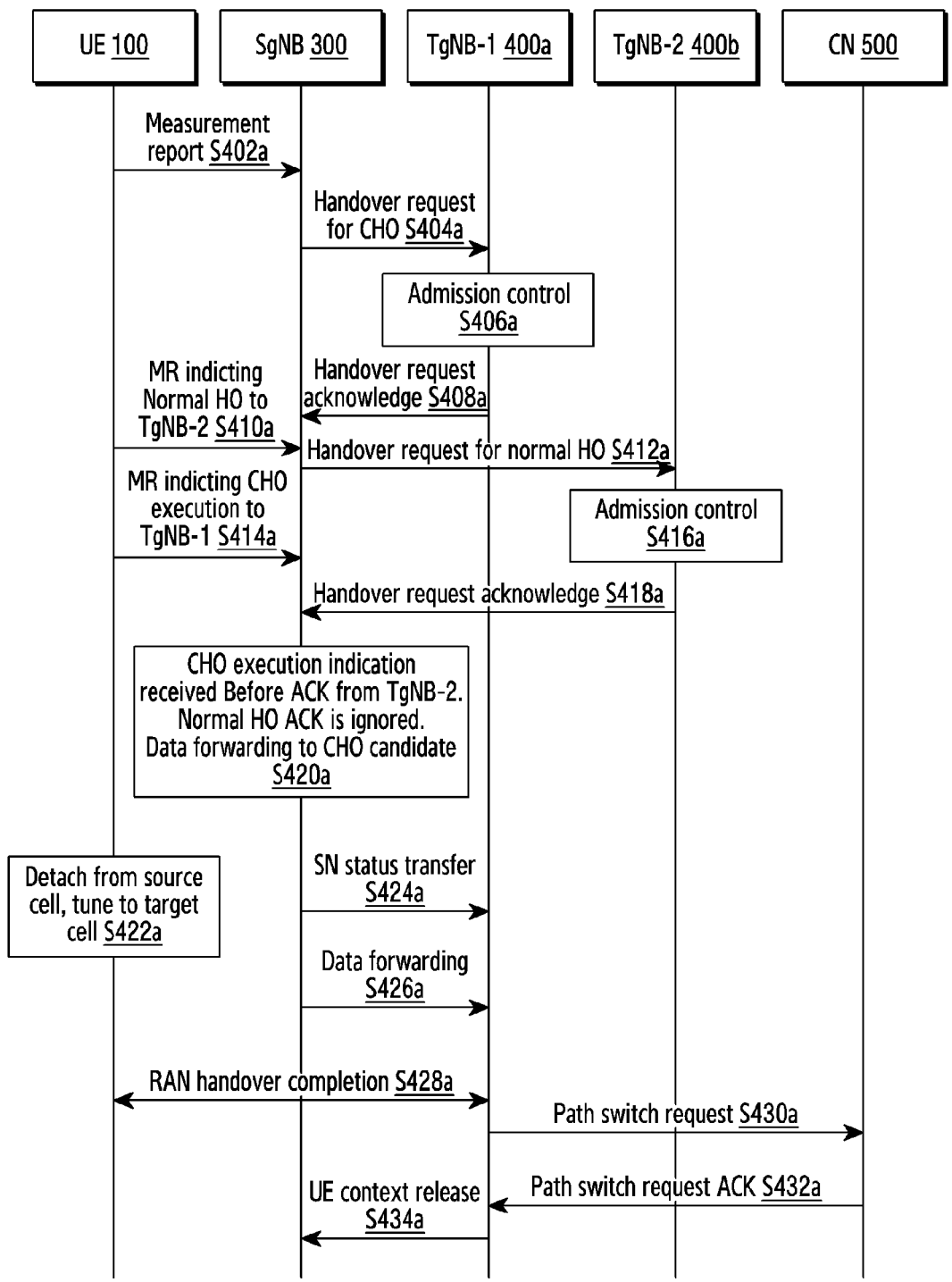
[Fig. 4A]

[Fig. 4B]
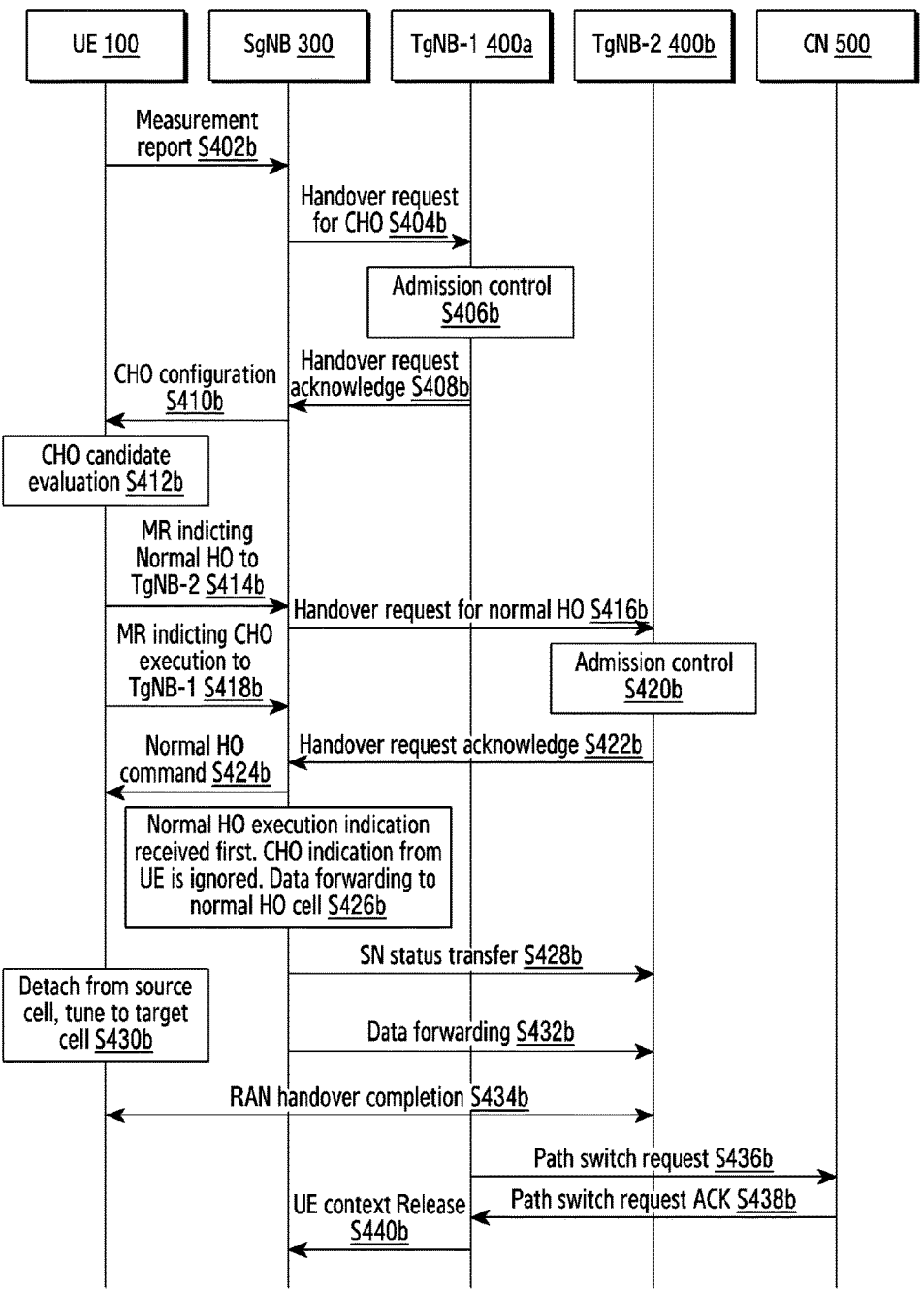
[Fig. 5]
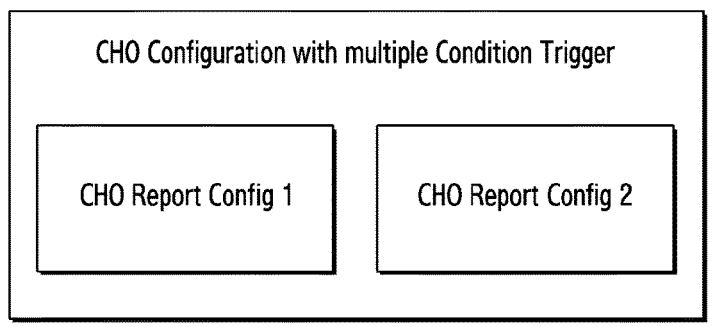

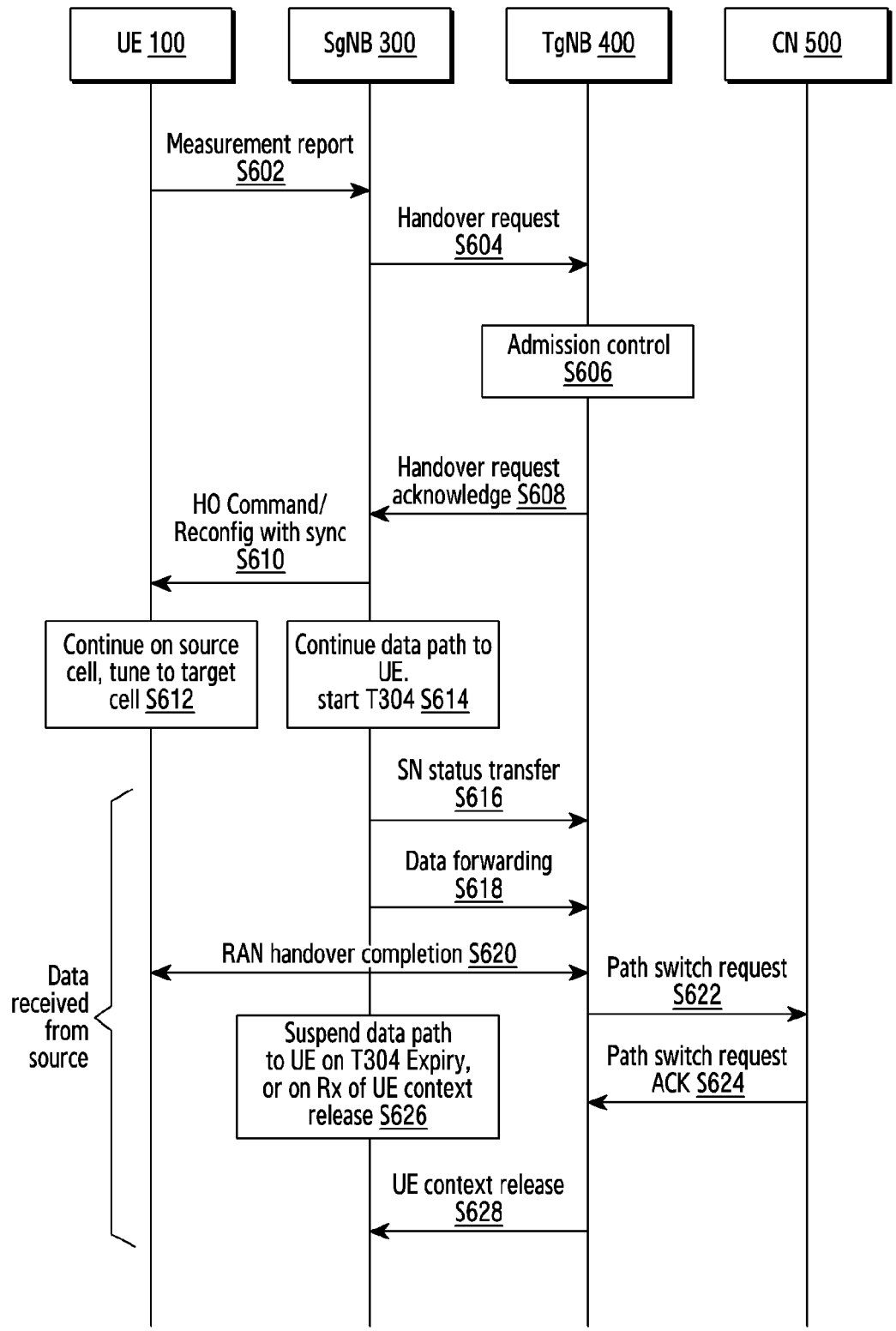
[Fig. 6]

METHOD AND UE FOR REPORTING ACCESSIBILITY MEASUREMENT IN WIRELESS COMMUNICATION SYSTEM

CROSS-REFERENCE TO RELATED APPLICATIONS

This application is a 371 National Stage of International Application No. PCT/KR2020/005642, filed Apr. 29, 2020, which claims priority to Indian Patent Application No. 201941017815, filed May 3, 2019, and Indian Patent Application No. 201941017815, filed Apr. 21, 2020, the disclosures of which are herein incorporated by reference in their entirety.

BACKGROUND

1. Field

The present disclosure relates to a wireless communication system, and more specifically related to a method and user equipment (UE) for accessibility measurement based on a Radio Resource Control (RRC) connection failure in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Fifth generation (5G) communication system (New Radio (NR)) is being developed in order to meet the growing need for broadband with an enhanced mobile broadband (eMBB) while also supporting new use cases like ultra-reliable low latency commination (URLLC) and massive machine type communication (mMTC). The NR is an Orthogonal frequency-division multiplexing (OFDM)-based air interface designed to support the wide variation of 5G device-types, services, deployments and spectrum. A base station (200) monitors the device behavior and provides the necessary resources to the UE (e.g., mobile phone, or the like) to perform any operation it requires (data—uplink or downlink, calls etc.). The signal strength and quality experienced by the UE varies according to the proximity of the UE with the gNB. The UE's near the cell are expected to have a better signal condition compared to the ones which are far from the gNB i.e. cell edge situation.

Base station (200) RAN Node (i.e., gNodeB) in the NR/eNB in the LTE always maintains a context on the UE that are in active RRC connection with it. At any point of time, the gNB can handover the UE from its control (i.e., source cell) to another gNB or another cell (i.e., target cell), thus transferring the entire context of the particular UE to the target cell. This decision is taken by base station (200) optionally based on assistance received from the UE, with the help of measurement reports about neighbor cells (i.e., gNB configures the UE to measure the signal condition of the serving cell and neighboring cells that may belong to a different gNB). There is a specific measurement criteria, and a specific reporting criteria, both of which are configured by the serving gNB. Due to various reasons like weak signal condition, heavy load on serving gNB etc., the serving gNB can handover the device to the neighbor cell or target gNB and this could be done based on assistance received from the UE in form of measurement reports.

The UE is continuously monitoring the quality of its radio link to ensure that the link is sufficiently in good conditions to successfully receive any transmission from the base station and to successfully make transmissions to the base station. When the UE identifies that that link quality has gone weak, the radio resource management (RRM) functionality performing radio link monitoring (RLM) at a PHY layer sends out of sync indications to the higher layers (i.e. RRC layer) thereby indicating the higher layer about the degradation in radio link quality. Once the link degradation condition reaches the allowed limit i.e. a configured threshold condition, the UE enters a state of outage i.e. poor radio conditions where the UE experience Qout (out of sync indication from radio resource manager) due to high block error rate. The current specifications provision the use of a configured T310 timer in this state. The UE declares the radio link failure (RLF) on the expiry of this timer T310 and initiates cell selection procedure to attempt recovery.

In the basic handover in the NR (and LTE as well), the source node (i.e., eNB for LTE and gNB for NR) triggers handover by sending HO request to the target node and after receiving ACK from the target node, the source node initiates handover by sending HO command along with target cell configuration. The UE sends PRACH to the target cell after RRC reconfiguration is applied with the received target cell configuration. Work is ongoing in 3GPP to improve the interruption caused due to handover and to improve the reliability of handover. The proposed invention are related to enhancements to existing handover mechanisms in LTE and NR to improve interruption time and reliability during handover.

Thus, it is desired to address the above mentioned shortcomings or at least provide a useful alternative.

SUMMARY

This present invention is to provide a method and UE for controlling enhanced mobility in a LTE and a NR.

Also, this present invention is to provide a method and an UE for executing a handover in a wireless communication system.

Accordingly, the embodiments herein disclose a method for reporting an accessibility measurement by a UE based on RRC connection establishment failure in a wireless communication system. The method includes detecting, by a UE, a RRC connection establishment failure. Further, the method includes logging, by the UE, parameters selected while attempting the failed RRC connection establishment, wherein the logged parameters are referred as accessibility measurements. Further, the method includes indicating, by the UE, a presence of a connection establishment failure report to a base station and reporting, by the UE, a connection establishment failure report to the base station, in response to receiving request from base station, wherein the failure report comprises accessibility measurements. The accessibility measurement comprises at least one of a synchronization signal block (SSB) information selected during cell access and subsequently on which the UE encountered the RRC connection establishment failure and a uplink carrier information selected during cell access and subsequently on which the UE encountered the RRC connection establishment failure. Further, the accessibility measurements enable the base station to accurately evaluate resources used by the UE during RRC connection establishment failure.

In an embodiment, the failure report is one of a fifth generation new-radio radio resource control (5G NR RRC) setup failure report and a 5G NR RRC resume failure report.

In an embodiment, the RRC connection establishment failure is one of a RRC connection setup failure and a RRC connection resume failure.

In an embodiment, the carrier information is one of a Supplementary Uplink (SUL) carrier and a Normal Uplink (NUL) carrier which is selected during cell access and subsequently logged by the UE upon encountering the RRC connection establishment failure.

In an embodiment, the logged value of the uplink carrier information is included in the connection establishment report in response to receiving request from the base station.

In an embodiment, the SSB information is the SSB index which is selected during cell access and subsequently logged by the UE upon encountering the RRC connection establishment failure.

In an embodiment, the logged value of SSB index is included in the connection establishment report in response to receiving request from the base station.

Accordingly, the embodiments herein disclose an UE for accessibility measurement based on RRC connection establishment failure in a wireless communication system. The UE includes a processor coupled with a memory. The processor is configured to detect a RRC connection failure and log parameters selected while attempting the failed RRC connection establishment, where the logged parameters are referred as the accessibility measurement. Further, the processor is configured to indicate a presence of a connection establishment failure report to a base station and receive a request corresponding to the connection establishment failure report from the base station. In response to receiving request from the base station, the processor is configured to report the connection establishment failure report to the base station in the wireless communication system. The connection establishment failure report comprises the accessibility measurements, wherein the accessibility measurements comprise at least one of a synchronization signal block (SSB) information selected during cell access and subsequently on which the UE encountered the RRC connection establishment failure and a uplink carrier information selected during cell access and subsequently on which the UE encountered the RRC connection establishment failure.

Accordingly, the embodiments herein disclose a method for executing a handover by an UE in a wireless communication system. The method includes receiving, by the UE, from a source cell a handover configuration comprising an execution condition associated with at least one candidate target cell from a plurality of candidate target cells and a configuration associated with the at least one candidate target cell from the plurality of candidate target cell. Further, the method includes evaluating, by the UE, the execution condition associated with the at least one candidate target cell. Further, the method includes determining, by the UE, that the execution condition is fulfilled for a target cell from the plurality of candidate target cells. Further, the method includes executing, by the UE, the handover towards the target cell based on the determination.

Accordingly, the embodiments herein disclose a UE for executing a handover in a wireless communication system. The UE includes a processor coupled with the memory. The processor is configured to receive from a source cell a handover configuration comprising an execution condition associated with at least one candidate target cell from a plurality of candidate target cell and a configuration associated with the at least one candidate target cell from the plurality of candidate target cells. Further, the processor is configured to evaluate the execution condition associated with the at least one candidate target cell. Further, the processor is configured to determine that the execution condition is fulfilled for a target cell. Further, the processor is configured to execute the handover towards the target cell based on the determination.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous effects of this present invention are to provide a method and an UE for accessibility measurement based on a RRC connection establishment failure in a wireless communication system.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which:

FIG. 1 is a schematic view of a wireless communication system for accessibility measurement based on a RRC connection failure, according to the embodiments as disclosed herein;

FIG. 2a is a flow chart illustrating a method for reporting accessibility measurement based on the RRC connection establishment failure in the wireless communication system, according to the embodiments as disclosed herein;

FIG. 2b is a flow chart illustrating a method for executing the handover in the wireless communication system, according to the embodiments as disclosed herein;

FIG. 3a illustrates a sequence diagram in which a simplified model of release 15 handover is depicted, according to the current release 15 specifications;

FIG. 3b illustrates a sequence diagram in which a source cell initiates transmission of SN status transfer and data forwarding to the target cell indicated in a measurement report that triggers CHO execution at a UE, according to the embodiments as disclosed herein;

FIG. 4a illustrates sequence diagram in which a source cell ignores a handover ACK received for normal handover preparation if it has already received measurement report from the UE indicating CHO execution, according to the embodiments as disclosed herein;

FIG. 4b illustrates a sequence diagram in which the UE cancels the CHO execution and performs normal HO execution if normal HO command is received from the source cell prior to receiving L2 ACK or HARQ ACK for CHO measurement report transmission, according to the embodiments as disclosed herein;

FIG. 5 illustrates the base station configuring the UE with multiple CHO condition to enable the UE to evaluate candidate target cells for execution CHO, according to the embodiments as disclosed herein; and FIG. 6 illustrates a sequence diagram in which the source cell continues to serve the UE even after providing handover command, until the expiry of timer at the source cell that is equivalent to T304 timer configure to the UE for handover, or on the event of receiving UE CONTEXT RELEASE message from target cell on successful completion of path switch, according to the embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms the handover command and reconfiguration with synchronization are interchangeably used in the disclosure and both of these refer to the message that triggers handover execution procedure at the UE.

Accordingly, the embodiments herein disclose a method for reporting an accessibility measurement by a UE based on RRC connection establishment failure in a wireless communication system. The method includes detecting, by a UE, a RRC connection establishment failure. Further, the method includes logging, by the UE, parameters selected while attempting the failed RRC connection establishment, wherein the logged parameters are referred as accessibility measurements. Further, the method includes indicating, by the UE, a presence of a connection establishment failure report to a base station and reporting, by the UE, a connection establishment failure report to the base station, in response to receiving request from base station, wherein the failure report comprises accessibility measurements. The accessibility measurement comprises at least one of a synchronization signal block (SSB) information selected during cell access and subsequently on which the UE encountered the RRC connection establishment failure and an uplink carrier information selected during cell access and subsequently on which the UE encountered the RRC connection establishment failure. Further, the accessibility measurements enable the base station to accurately evaluate resources used by the UE during RRC connection establishment failure.

Unlike conventional methods and systems, the method can be used to control an enhanced mobility in a LTE and a NR. The method can be used to initiate data forwarding in conditional handover based on indication from the UE. The method can be used to avoid duplicate handover command to the UE. The method can be used to configure CHO execution condition, so as to identify condition to stop transmission on source cell during an eMBB based handover.

The method can be used to indicate Beam ID in accessibility measurements in logged MDT. The method can be used to indicate UL carrier id in accessibility measurements in logged MDT. The method can be used to indicate from UE regarding the type(s) of make before break handover it supports. In the proposed methods, the base station (200) provisions to make before break handover based on one of the multiple handover types that are supported by the UE.

The proposed method can be used to reduce interruption time and improve reliability during handover even the UE is in existing handover mechanisms in LTE and NR systems.

The method can be used to correctly evaluate the resources used when the UE encountered connection establishment failure and UE needs to indicate the SSB which it selected to access the cell.

The method can be used to correctly evaluate the resources used when the UE encountered connection resume failure and UE needs to indicate the SSB which it selected to access the cell. The method can be used to correctly evaluate the resources used when the UE encountered connection establishment failure and UE needs to indicate the UL carrier it selected to access the cell. The method can be used to correctly evaluate the resources used when the UE encountered connection resume failure and UE needs to indicate the UL carrier it selected to access the cell.

In the proposed methods, the beam information (e.g. attempted beam index) can be indicated as part of RACH information. In other words, attempted SSB index can be indicated as part of RACH failure information.

In the proposed methods, SSB index of the downlink beams of both serving cell and neighbour cells and the corresponding measurement results and SUL/NUL carrier information should be included in the 5G NR RRC connection failure reporting.

Referring now to the drawings, and more particularly to FIGS. 1 through 6, where similar reference characters denote corresponding features consistently throughout the figures, there are shown preferred embodiments.

FIG. 1 is a schematic view of a wireless communication system (1000) for accessibility measurement based on a RRC connection failure, according to the embodiments as disclosed herein. In an embodiment, the wireless communication system (1000) includes a UE (100) and a base station (200). The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) includes a processor (110), a communicator (120), and a memory (130). The processor (110) is coupled with the memory (130) and the communicator (120). The processor (110) includes an accessibility measurement based RRC connection establishment failure determination engine (110*a*) and a CHO engine (110*b*). The processor (110) is configured to execute instructions stored in the memory (130) and to perform various processes. The communicator (120) is configured for communicating internally between internal hardware components and with external devices via one or more networks.

The memory (130) stores instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

The accessibility measurement based RRC connection establishment failure determination engine (110*a*) is configured to detect a RRC connection failure and log parameters selected while attempting the failed RRC connection establishment. The logged parameters are referred as the accessibility measurement. In an embodiment, the RRC connection establishment failure is one of a RRC connection setup failure and a RRC connection resume failure.

Further, the accessibility measurement based RRC connection establishment failure determination engine (110*a*) is configured to indicate a presence of a connection establishment failure report to a base station (200) and receive a request corresponding to the connection establishment failure report from the base station (200). In an embodiment, the connection establishment failure report is one of a fifth generation new-radio radio resource control (5G NR RRC) setup failure report and a 5G NR RRC resume failure report.

In response to receiving request from the base station (200), the accessibility measurement based RRC connection establishment failure determination engine (110*a*) is configured to report the connection establishment failure report to the base station in the wireless communication system. The connection establishment failure report comprises the accessibility measurement, wherein the accessibility measurement includes at least one of a synchronization signal block (SSB) information selected during cell access and subsequently on which the UE (100) encountered the RRC connection establishment failure and a uplink carrier information selected during cell access and subsequently on which the UE (100) encountered the RRC connection establishment failure.

In an embodiment, the accessibility measurement enables the base station (200) to evaluate resources used by the UE (100) during the RRC connection establishment failure.

In an embodiment, the uplink carrier information is one of a Supplementary Uplink (SUL) carrier and a Normal Uplink (NUL) carrier, wherein the SUL carrier or the NUL carrier is selected during cell access and subsequently logged by the UE (100) upon encountering the RRC connection establishment failure.

In an embodiment, the SSB information comprises at least one of a SSB index, which is selected during cell access and subsequently logged by the UE (100) upon encountering the RRC connection establishment failure.

In an embodiment, the logged value of SSB index is included in the connection establishment report in response to receiving request from the base station (200)

In an embodiment, the logged value of uplink carrier information is included in the connection establishment failure report in response to receiving request from the base station (200).

In an embodiment, the CHO engine (110*b*) is configured to receive from a source cell a handover configuration comprising an execution condition associated with at least one candidate target cell from the plurality of candidate target cell and a configuration associated with the at least one candidate target cell from the plurality of candidate target cell.

In an embodiment, the execution condition includes a measurement identity linking a measurement object and one of: a single report configuration or two report configurations.

In an embodiment, if the two report configurations are included in the execution condition then a first report configuration indicates a measurement event as one of: a A3 event or a A5 event, and a trigger quantity as one of: a Reference Signals Received Power (RSRP) or a Reference Signal Received Quality (RSRQ) or a signal-to-interferenceplus-noise ratio (SINR), a second report configuration indicates a measurement event as one of: a A3 event or a A5 event or a A4 event, and a trigger quantity as one of: a RSRP or RSRQ or a SINR, and wherein the trigger quantity in the first report configuration is different from the trigger quantity in the second report configuration. Further, the reference signal type in the first report configuration and the reference signal type in the second report configuration is same.

Further, the CHO engine (110b) is configured to evaluate the execution condition associated with the at least one candidate target cell. In an embodiment, evaluate the execution condition associated with at least one target cell comprises identify a fulfilment of an event indicated in the first report configuration and a fulfilment of an event indicated in the second report configuration.

Further, the CHO engine (110b) is configured to determine that the execution condition is fulfilled for a target cell. In an embodiment, determine that the execution condition is fulfilled for the candidate target cell comprises indicating a joint fulfillment of events in the first report configuration and the second report configuration.

Further, the CHO engine (110b) is configured to execute the handover towards the candidate target cell based on the determination. In an embodiment, execute the handover towards the candidate target cell is performed upon selecting the target cell from the plurality of candidate target cells for which joint fulfillment of events is determined and applying from the received handover configuration the target cell configuration associated with the selected target cell.

Although the FIG. 1 shows various hardware components of the wireless communication system (1000) but it is to be understood that other embodiments are not limited thereon. In other embodiments, the wireless communication system (1000) may include less or more number of components. Further, the labels or names of the components are used only for illustrative purpose and does not limit the scope of the invention. One or more components can be combined together to perform same or substantially similar function to handle the accessibility measurement based on RRC connection failure.

According to various embodiments, this present invention provides that a user equipment (UE) (100) for reporting an accessibility measurement in a wireless communication system (1000), comprising:
a memory (130); and
a processor (110), coupled with the memory (130), configured to:
detect a Radio Resource Control (RRC) connection establishment failure;
log parameters selected while attempting the failed RRC connection establishment, wherein the logged parameters are referred as the accessibility measurement;
report a connection establishment failure report to a base station (200) in the wireless communication system (1000) based on log.

According to various embodiments, wherein report the connection establishment failure report to the base station (200) in the wireless communication system (1000) based on the log comprises:
indicate the RRC connection establishment failure to the base station (200);
receive a request corresponding to the indicated RRC connection establishment failure report from the base station (200); and
report the connection establishment failure report to the base station (200) in the wireless communication system (1000) based on the request.

According to various embodiments, wherein the connection establishment failure report comprises the accessibility measurement, wherein the accessibility measurement comprises at least one of a synchronization signal block (SSB) information and a uplink carrier information.

According to various embodiments, wherein the connection establishment failure report is one of a fifth generation new-radio radio resource control (5G NR RRC) setup failure report and a 5G NR RRC resume failure report.

According to various embodiments, wherein the RRC connection establishment failure is one of a RRC connection setup failure and a RRC connection resume failure.

According to various embodiments, wherein the uplink carrier information is one of a Supplementary Uplink (SUL) carrier and a Normal Uplink (NUL) carrier, wherein the SUL carrier or the NUL carrier is selected during cell access and subsequently logged by the UE (100) upon encountering the RRC connection establishment failure.

According to various embodiments, wherein the SSB information comprises at least one of a SSB index, which is selected during cell access and subsequently logged by the UE (100) upon encountering the RRC connection establishment failure.

According to various embodiments, wherein a logged value of the SSB index is included in the connection establishment report in response to receiving a request from the base station (200).

According to various embodiments, wherein a logged value of the uplink carrier information is included in the connection establishment failure report in response to receiving a request from the base station (200).

FIG. 2a is a flow chart (S200a) illustrating a method for reporting an accessibility measurement based on the RRC connection establishment failure in the wireless communication system (1000), according to the embodiments as disclosed herein. The operations (S202a to S210a) are performed by the processor (110).

At 202a, the method includes detecting the RRC connection establishment failure. At 204a, the method includes logging parameters selected while attempting the failed RRC connection establishment, wherein the logged parameters are referred as the accessibility measurement.

At 206a, the method includes indicating a presence of a connection establishment failure report to the base station (200). At 208a, the method includes receiving the request corresponding to the connection establishment failure report from the base station (200).

At 210a, the method includes reporting the connection establishment failure report to the base station (200) in the wireless communication system (1000) in response to receiving request from the base station (200). The connection establishment failure report comprises the accessibility measurement, wherein the accessibility measurement comprises at least one of a synchronization signal block (SSB) information selected during cell access and subsequently on which the UE (10) encountered the RRC connection establishment failure and a uplink carrier information (SUL or NUL) selected during cell access and subsequently on which the UE (100) encountered the RRC connection establishment failure.

FIG. 2b is a flow chart (S200b) illustrating a method for executing the handover in the wireless communication system (1000), according to the embodiments as disclosed herein. The operations (S202b to S208b) are performed by the processor (110).

At S202b, the method includes receiving from the source cell the handover configuration comprising the execution condition associated with the at least one candidate target cell from the plurality of candidate target cell and the configuration associated with the at least one candidate target cell from the plurality of candidate target cell. At S204b, the method includes evaluating the execution condition associated with the at least one candidate target cell. At S206b, the method includes determining that the execution condition is fulfilled for a target cell from the plurality of target cell. At S208b, the method includes executing the handover towards the target cell based on the determination.

According to various embodiments, this present invention provide that a method for reporting an accessibility measurement in a wireless communication system (1000), comprising:
  detecting, by a User Equipment (UE) (100), an Radio Resource Control (RRC) connection establishment failure;
  logging, by the UE (100), parameters selected while attempting the failed RRC connection establishment, wherein the logged parameters are referred as the accessibility measurement; and
  reporting, by the UE (100), a connection establishment failure report to a base station (200) in the wireless communication system (1000) based on the logging.

According to various embodiments, wherein reporting, by the UE (100), the connection establishment failure report to the base station (200) in the wireless communication system (1000) based on the logging comprises:
  indicating, by the UE (100), the RRC connection establishment failure to the base station (200);
  receiving, by the UE (100), a request corresponding to the indicated RRC connection establishment failure report from the base station (200); and
  reporting, by the UE (100), the connection establishment failure report to the base station (200) in the wireless communication system (1000) based on the request.

According to various embodiments, wherein the connection establishment failure report comprises the accessibility measurement, wherein the accessibility measurement comprises at least one of a synchronization signal block (SSB) information and an uplink carrier information.

According to various embodiments, wherein the RRC connection establishment failure is one of a RRC connection setup failure and a RRC connection resume failure.

According to various embodiments, wherein the uplink carrier information is one of a Supplementary Uplink (SUL) carrier and a Normal Uplink (NUL) carrier, wherein the SUL carrier or the NUL carrier is selected during a cell access and subsequently logged by the UE (100) upon encountering the RRC connection establishment failure.

According to various embodiments, wherein the SSB information comprises at least one of a SSB index, which is selected during cell access and subsequently logged by the UE (100) upon encountering the RRC connection establishment failure.

According to various embodiments, wherein a logged value of the SSB index is included in the connection establishment report in response to receiving a request from the base station (200).

According to various embodiments, wherein a logged value of the uplink carrier information is included in the connection establishment failure report in response to receiving a request from the base station (200).

FIG. 3a illustrates a sequence diagram in which a simplified model of release 15 handover is depicted, according to the embodiments as disclosed herein.

During the mobility procedures currently available in normal LTE HO and NR Release 15 specifications, on receiving handover command (or reconfiguration with sync) from the base station (200), the UE (100) suspends operation on the source eNB/gNB, tunes to the target frequency (i.e. DL synchronization) and performs random access on the target cell. After random access is successfully completed on the target cell, data exchange is resumed with the target cell. There is a visible interruption between suspending operation on source eNB/gNB and resuming operation on the target eNB/gNB. Moreover, the existing handover model relies on the measurement report that the UE (100) sends to the base station (200), making the base station (200) aware that the source cell is weak and one or more neighbor cell(s) that is better than the source cell. The RF and coverage planning for the base station (200) is done in such a way that the neighbor cells have minimum overlap in the cell edges. The overlap is sufficient to aid the handover between these cells and not create significant interference between transmissions from the cells. They are provisioned to provide this form of coverage footprint to reduce deployment cost as well. As a result, the area referred as handover region where the UE (100) identifies that the neighbor cell has become stronger than the current serving cell is based on trigger condition, referred as measurement event. The UE (100) triggers the measurement report and sends to the source eNB/gNB when the measurement event is triggered. The source node now prepares one or more target cell(s) indicated in the measurement report for the handover. Once admission control for the UE (100) is completed on the potential target node, handover acknowledgement is provided to the source cell. The source cell decides the target cell and provides the handover command to the UE (100) with the necessary configuration to access the target cell.

At time, the base station (200) takes to prepare the target cell for handover, may be longer than the time the UE (100) can sustain connection with the source cell. This leads to a case where the UE (100) does not successfully receive the handover command from the source cell due to further degraded signal condition. This is especially common in high mobility scenarios or if the handover region suffers from high interference. As a result, in release 16, both LTE and NR is introducing a new handover model where the target cell is prepared for handover in advance and the UE (100) can autonomously execute handover to the target cell based on condition(s) provided by the base station (200). This model of handover is referred to as conditional handover. Due to departure from traditional handover model which is under complete base station control, conditional handover which is under partial base station control demands certain changes as compared to traditional handover.

In an embodiment, the method can be used to initiate data forwarding in the conditional handover based on indication from the UE (100). Once admission control is successful at the target node, the UE (100) sends handover acknowledgement to the source node. During this time, the user plane connection to core network (500) (i.e., path switch) is still at the source node and has not been switched to the target node. The path switch from the source cell to the target cell can be done only on successful completion of handover to the target cell. The source node now sends SN transfer status to the target node to make it aware of the sequence number (SN) it has to apply for its transmissions in downlink (DL) and uplink (UL) and performs data forwarding. The data forwarding is the process of forwarding all pending packets from the source node to the target node. This is done because the source cell stops communication with the UE (100) as soon as the source cell receives the handover acknowledgement from the target cell and sends handover command (reconfiguration with sync) to the UE (100). The forwarded packets are then transferred to the UE (100) via the target cell once handover is successful i.e. upon successful completion of random access in the target cell.

In Release 15 handover, based on the measurement report received from the UE (100), typically the source decides the target cell from the one or more target cell(s) reported by the UE (100). There may be only one target cell that is prepared for handover by the source cell. Therefore, as soon as handover acknowledgement is received from the target cell, data forwarding and SN status transfer to target can be performed. However, in conditional handover, since the UE (100) evaluates the handover condition at a later stage and apriori it is not known which the target cell meets the handover condition, there can be multiple cells that are prepared for a potential handover of the UE (100). Multiple target cells are prepared, as the source cell cannot accurately predict the target cell to which the UE (100) may have to perform handover to, in advance. Performing SN status transfer and data forwarding to all of the prepared cells introduces a heavy load on the X2 interface of the base station (200) and consequently huge resource wastage. Therefore, it is imperative that the traditional timing and trigger for data forwarding from source node to the target node, as soon as target cell is prepared for handover cannot be adopted in conditional handover.

A new trigger condition for data forwarding in conditional handover (CHO) then needs to be defined. In CHO, the target cell configuration is sent to the UE (100) in advance and the actual handover execution is performed at a later point in time when the handover condition is met i.e. measurement event is triggered. The handover execution to the target cell is controlled by means of a condition that is configured to the UE (100) along with CHO configuration.

In this method, when the condition for execution of the CHO is satisfied, the UE (100) sends an indication to the source cell. In theory, a measurement object involving the serving cell and the target cell evaluation (like event A3, event A5) is used to assist the base station (200) in initiating handover of the UE (100) to the neighbor cell. It serves as a mechanism to indicate to the base station (200) that the UE (100) is leaving its coverage area and approaching the coverage area of the neighbor cell. In order to facilitate conditional handover, the measurement report is not required to be sent to the source cell as the target cell is already prepared for handover. However, it is required to inform the source cell about the target cell to which the UE (100) is executing handover to. This will allow the source cell to trigger SN transfer status and data forwarding only to that target cell, and the forwarded data is already available at the target cell when the UE (100) successfully completes random access to the target cell. Therefore, in this mechanism, data forwarding is performed only to one target cell thereby avoiding resource wastage on X2 interface and allows less interruption time during handover as the target cell already has data to be forwarded to the UE (100) when it successfully accesses the target cell. In an embodiment, the UE (100) reports to the source cell, the measurement report that triggers execution of CHO to the target cell. In an embodiment, the UE (100) indicates the target cell identifier for which the CHO execution is trigger. The target cell identifier is one of the physical cell identifier (PCI) and DL-ARFCN (i.e. DL frequency) of the target cell or the Global cell identifier and DL-Absolute Radio Frequency Channel Number (ARFCN) of the target cell. This information regarding the target cell can be indicated in the measurement report along with measurement results or in any other new RRC message.

In traditional base station (200) controlled HO, most handover failure cases occur due to UE (100) not receiving handover commands on time. The delay from sending measurement report with neighbor cell details to the base station (200), and receiving handover command with the target cell configuration from the base station (200) is caused due to time taken in preparing the target cell for handover. By the time the target cell is successfully prepared for handover, the source cell signal conditions may degrade further making it improbable for the UE (100) to receive downlink transmissions successfully. However, the probability of receiving measurement report from the UE (100) indicating the measurement results for one or more neighbor cell(s) is high compared to the probability of receiving the handover command from the source when the target cell is prepared. The measurement condition configured to trigger the CHO execution is expected to have similar configuration as the measurement report used in the traditional handover to indicate the source cell about the UE (100) moving towards a neighbor cell. Therefore, the probability of successfully receiving the measurement report by the source node is high. The reception of measurement report by the source node serves as a trigger to initiate data forwarding to the target cell that is indicated in the measurement report.

As shown in the FIG. 3a, at S302a, the UE (100) sends the measurement report to the SgNB (300). At S304a, based on the measurement report, the SgNB (300) sends the handover request to the TgNB (400). Based on the handover request, at S306a, the TgNB (400) performs the admission control procedure. Based on the admission control procedure, at S308a, the TgNB (400) sends the handover request acknowledge message to the SgNB (300). After receiving the handover request acknowledge message from the TgNB (400), at S310a, the SgNB (300) sends the HO Command/Reconfig with sync message to the UE (100). Based on the HO Command/Reconfig with sync message, at S312a, the UE (100) detaches from the source cell and tune to target cell. At S314a, the SgNB (300) sends the SN status transfer message to the TgNB (400) and at S316a, the SgNB (300) sends the data forwarding to the TgNB (400). At S318a, the RAN handover completion is occurred between the UE (100) and the TgNB (400). At S320a, the TgNB (400) sends the path switch request to the CN (500). At S322a, the CN (500) sends the path switch request acknowledge message to the TgNB (400). At S324a, the TgNB (400) sends the UE context release to the SgNB (300).

FIG. 3b illustrates a sequence diagram in which the source cell initiates transmission of SN status transfer and data forwarding to the target cell indicated in the measurement report that triggers CHO execution at the UE (100), according to the embodiments as disclosed herein. In another embodiment, the source cell initiates transmission of SN status transfer and data forwarding to the target cell indicated in the measurement report that triggers CHO execution at the UE (100).

Once condition to execute CHO is satisfied, the measurement report is sent by the UE (100) to the source indicating the target cell identifier. The measurement report is sent using RLC AM, so there is RLC ACK from the source cell if it successfully received the measurement report. When the UE (100) receives the RLC ACK it performs handover related actions (i.e. HO execution) and tunes to the target cell frequency (i.e. DL synchronization). This may involve suspending transmit/receive operation on the source cell depending on the handover type—for handovers that does not support simultaneous connectivity with the source cell and the target cell. For handovers (i.e. make-before-break type HO) that allow continuing activity on the source cell even after handover execution is triggered the UE (100) does not suspend transmit/receive operation on the source cell while it tunes to the target cell frequency. In order to ensure that the data forwarding to target cell is initiated by the source cell, the UE (100) may wait until it receives layer 2 acknowledgement (i.e. RLC ACK) from the source cell for the measurement report it has sent. Therefore, in another embodiment, the UE (100) waits for L2 ACK (i.e. RLC ACK) for the transmitted measurement report prior to suspending operation on the source cell or initiating HO execution towards the target cell.

There is possibility that by the time L2 ACK (i.e. RLC ACK) is received by the UE (100), the signal conditions have degraded and the UE (100) is unable to successfully decode Physical Downlink Shared Channel (PDSCH). For handling such cases, a timer (predefined or configurable) may be used. The timer is started on sending the measurement report that triggers the CHO execution to the base station (200). The timer is stopped on receiving L2 ACK for the measurement report. When the timer is expired, the UE (100) stops monitoring the source cell for L2 ACK and attempts for handover on the target cell i.e. HO execution on the target cell is triggered.

Under cases where the signal condition may degrade at a very fast rate (e.g. deep fading in higher frequency ranges), it is possible that the measurement report sent to the source cell is not successfully received. However, the UE (100) may still proceed with CHO to the target cell upon the CHO condition is satisfied and the timer to receive RLC ACK is expired. In such cases, when the UE (100) completes successful random access in the target cell and the target cell determines that data forwarding path is not established/SN status transfer is not received from the source cell, the target cell can request the source cell for SN status transfer and data forwarding. In an embodiment, the target cell requests the source cell for SN status transfer and data forwarding, if it is not initiated by the source cell by the time when the UE (100) successful completes random access on the target cell.

At S302b, the UE (100) sends the measurement report to the SgNB (300). At S304b, based on the measurement report, the SgNB (300) sends the handover request to the TgNB1 (400a). Based on the handover request, at S306b, the TgNB1 (400a) performs the admission control procedure. Based on the admission control procedure, at S308b, the TgNB1 (400a) sends the handover request acknowledge message to the SgNB (300).

After receiving the handover request acknowledge message from the TgNB1 (400a), at S310b, the SgNB (300) sends the handover request to the TgNB2 (400b). Based on the handover request, at S312b, the TgNB2 (400b) performs the admission control procedure. Based on the admission control procedure, at S314b, the TgNB2 (400b) sends the handover request acknowledge message to the SgNB (300).

At S316b, the SgNB (300) sends the CHO configuration to the UE (100). At S318b, the UE (100) performs the CHO candidate evaluation and at S320b, the UE (100) performs the CHO event triggered for TgNB1 (400a). At S322b, the UE (100) specifies the MR indicting CHO execution to TgNB1 (400a). At 324b, the UE (100) detaches from the source cell and tune to target cell. At S326b, the SgNB (300) sends the SN status transfer message to the TgNB1 (400a) and at 328b, the SgNB (300) sends the data forwarding to the TgNB1 (400a). At 330b, the RAN handover completion is occurred between the UE (100) and the TgNB1 (400a). At S332b, the TgNB1 (400a) sends the path switch request to the CN (500). At S334b, the CN (500) sends the path switch request acknowledge message to the TgNB (400). At S336b, the TgNB1 (400a) sends the UE context release to the SgNB (300).

FIG. 4a illustrates a sequence diagram in which the source cell ignores the handover ACK received for normal handover preparation if it has already received measurement report from the UE (100) indicating CHO execution, according to the embodiments as disclosed herein.

In an embodiment, the method can be used to avoid duplicate handover command to the UE (100). In CHO, the UE (100) is pre-configured with potential candidate cells for handover. However, it is possible that the UE mobility is towards other neighbor cells which are not part of the CHO candidates. In such cases, the base station (200) configures a regular handover based on measurement report from the UE (100). This handover command has higher priority than CHO configuration received and therefore takes precedence if the CHO condition is not triggered.

In another scenario, it is possible that the UE (100) sends the measurement report for a neighbor cell which is not a CHO candidate (e.g. TgNB-2 in the FIG. 4A). The neighbor cell (TgNB-2) is prepared for handover and handover ACK is sent to the source cell. It is possible that during the HO preparation phase for TgNB-2, the UE (100) satisfies the condition for CHO execution for a candidate cell in the CHO configuration (TgNB-1 in the FIG. 4A) and sends the related measurement report to the source cell. At this point, the source cell has 2 target cells prepared for handover—one is the target cell (TgNB-2) based on normal handover preparation and other is the target cell (TgNB-1) based on CHO preparation. However, the source cell has not yet received the HO Request ACK from TgNB-2 when it receives the measurement report for TgNB-1. The UE (100) can perform handover only to one of them and it is imperative that the source cell performs the SN status transfer and data forwarding to the same target cell that the UE (100) attempts handover to (i.e. TgNB-1). In an embodiment, the source cell ignores the handover ACK received for normal handover preparation if it has already received measurement report from the UE indicating CHO execution as illustrated in FIG. 4A.

At S402a, the UE (100) sends the measurement report to the SgNB (300). At S404a, based on the measurement report, the SgNB (300) sends the handover request for the CHO to the TgNB1 (400a). Based on the handover request, at S406a, the TgNB1 (400a) performs the admission control procedure. Based on the admission control procedure, at S408a, the TgNB1 (400a) sends the handover request acknowledge message to the SgNB (300).

At S410a, the UE (100) sends the MR indicting normal HO to TgNB-2 (400b). At 412a, the SgNB (300) sends the handover request for normal HO to the TgNB2 (400b). At 414a, the UE (100) sends the MR indicting CHO execution to TgNB1 (400a). Based on the handover request, at 416b, the TgNB2 (400b) performs the admission control procedure. Based on the admission control procedure, at S418b, the TgNB2 (400b) sends the handover request acknowledge message to the SgNB (300). At S420a, the SgNB (300) performs the CHO execution indication received before ACK from TgNB-2, normal HO ACK is ignored, and data forwarding to CHO candidate.

At S422a, the UE (100) detaches from the source cell and tune to the target cell. At S424a, the SgNB (300) sends the SN status transfer message to the TgNB1 (400*a*) and at S426*a*, the SgNB (300) sends the data forwarding to the TgNB1 (400*a*). At S428*a*, the RAN handover completion is occurred between the UE (100) and the TgNB1 (400*a*). At S430*a*, the TgNB1 (400*a*) sends the path switch request to the CN (500). At S432*a*, the CN (500) sends the path switch request acknowledge message to the TgNB1 (400*a*). At S434*a*, the TgNB1 (400*a*) sends the UE context release to the SgNB (300).

FIG. 4*b* illustrates a sequence diagram in which the UE (100) cancels the CHO execution and performs the normal HO execution if normal HO command is received from the source cell prior to receiving L2 ACK or HARQ ACK for CHO measurement report transmission, according to the embodiments as disclosed herein.

Similarly, it is possible that the UE (100) sends the CHO triggering measurement report to the base station (200) and by then, HO command for a normal handover is received at the UE (100). In another scenario, it is possible that the UE (100) sends the measurement report for a neighbor cell which is not a CHO candidate (e.g. TgNB-2 in the FIG. 4B). The neighbor cell (TgNB-2) is prepared for handover and handover ACK is sent to the source cell. It is possible that upon completion of the HO preparation phase for the TgNB-2, the UE (100) satisfies the condition for CHO execution for a candidate cell in the CHO configuration (TgNB-1 in the FIG. 4B) and the UE (100) sends the related measurement report to the source cell. At this point, the source cell has 2 target cells prepared for handover—one is the target cell (TgNB-2) based on normal handover preparation and other is the target cell (TgNB-1) based on CHO preparation. However, the source has received the HO Request ACK from TgNB-2 before it receives the measurement report for TgNB-1. The UE (100) can perform handover only to one of them and it is imperative that the source cell performs SN status transfer and data forwarding to the same target cell that the UE attempts handover to (i.e. TgNB-2).

In an embodiment, the UE (100) cancels the CHO execution and performs the normal HO execution if normal HO command is received from the source cell prior to receiving L2 ACK (i.e. RLC ACK) or HARQ ACK for CHO measurement report transmission as illustrated in FIG. 4B. As a corollary, once handover execution detail is received at the source cell i.e. measurement report for CHO or HO preparation ACK for normal HO, the source node processes the first message it receives and ignores the message that arrives later. As a result, if the UE (100) receives HO command after transmission of CHO MR (before L2 ACK of CHO MR), then the UE (100) shall execute normal handover. This is done because the UE (100) should be aware that the source cell provided normal HO command as this arrived at the source cell earlier in time than the CHO triggering measurement report. Therefore, data forwarding is initiated by source cell to the target cell for which handover indication is received earliest at the source cell.

In an embodiment, the method can be used to configure CHO execution condition. The UE (100) reports the event A1 only when serving cell signal condition is good i.e., A1 is reported when serving cell signal condition is better than a network configured threshold. The base station (200) (i.e., source gNB) on receiving event A1 from the UE (100) may reconfigure/add/remove other measurement ids, for example to configure A2 to identify when the signal condition of the UE starts degrading below a configured value. Therefore, A1 event is not suitable to trigger a handover to a neighbour cell.

The UE (100) reports Event A2 only when serving cell signal condition is poor and does not indicate to the base station (200) about a potential neighbour cell that is under good signal conditions i.e., A2 is reported when serving cell signal condition is weaker than a network configured threshold. The source gNB on receiving the event A2 may either reconfigure/add/remove a measurement id, for example source gNB configures A1 to identify when the UE signal conditions improve or configures A3/A5 to identify if the neighbour cell is in suitable signal conditions to serve the UE (100). Alternatively, the source gNB may perform blind preparation of the target cell and provide the handover command to the UE. However, this does not guarantee a good handover success rate as the UE vicinity to these neighbour cells is not known to the source gNB. Event A2 based blind handovers may be useful only in cases where there are two collocated cells, one belonging to low frequency and other belonging to high frequency, and the coverage of these cells are overlapping and overlaying. In these cases, the UE (100) connected to higher frequency cell may be handed over to the cell operating on lower frequency without the knowledge of the signal condition of the target cell (cell on lower frequency has larger coverage footprint). This is a very limited scenario and may not be applied extensively in practical deployments. Although, the event A2 can be used to trigger handover, the event A2 alone cannot be used to perform a reliable handover.

The UE (100) reports the event A4 only when the neighbour cell signal condition is good i.e., A4 is reported when neighbour cell signal condition is better than a network configured threshold. The source gNB on receiving the event A4 may reconfigure/add/remove other measurement ids, for example, the source gNB configures Event A3/A5 to understand the neighbour cell signal conditions in comparison the serving cell signal conditions. Alternatively, the source gNB may provide handover command to the UE (100) to the neighbour cell reported in Event A4. Although the handover to the target cell may be successful due to good signal condition of the target cell, it does not ensure that the target cell is better than the source cell. It is possible that signal condition and QoS provided by the target cell are poor as compared to source cell. Although, the event A4 can be used to trigger handover, Event A4 alone cannot be used to perform a reliable handover.

In order to provision a reliable handover to the neighbour cell, the source gNB should be aware that a neighbour cell can provide better service to the UE (100) than the current serving cell. Events A3 and A5 provides both the serving cell and neighbour cell signal conditions to the base station (200). A3 is reported when a neighbour cell signal condition is better than the serving cell by at least a configured offset. A5 is reported when the serving cell signal condition is weaker than a configured threshold value and neighbour cell signal condition is better than another network configured threshold value. Therefore, the source gNB is in a position to understand if the neighbour cell can provide better service. However, in some cases, more than one events are needed for triggering handover reliably.

In traditional handover, the base station (200) configures several measurement events to the UE (100). It is not necessary that the base station (200) prepares the target cell based on each relevant measurement report from the UE (100). The base station (200) may take decision of providing handover command to the UE (100) based on multiple measurement report or the sequence of measurement report from the UE (100). It is also possible for the source node to be aware of the load condition of the neighbor node/target node. The target cell may be prepared for handover only if load conditions are within acceptable levels even if measurement results indicate that the neighbor cell is under better signal conditions. As a consequence, sometimes handover is not provided to the best cell reported to the base station (200) in measurement report.

However, in case of conditional handover, the condition for executing the handover is configured to the UE (100) and the UE (100) autonomously executes handover based on this condition. Therefore, the CHO is under partial base station (200) control. There is no intelligence at the UE (100) when it executes the CHO towards the target unlike that of base station (200) in traditional handover, the base station (200) judiciously decides the handover of the UE (100) to the neighbor target cell based on such the base station (200) intelligence e.g. load condition of target. In traditional handover, the serving cell provides handover command to the UE (100) if the neighbor signal conditions are good, and the load of the neighbor cell is acceptable to serve the additional UE (100). However, in conditional handover, the condition to trigger CHO execution is provided much earlier in time. It is possible that during this time, the target cell load was low enough to allow for more UEs (100) to access the cell. However, the actual CHO execution happens at a later time and by then the load on the target cell may have changed. However, when the CHO triggers and the UE (100) executes handover to the target cell, the load in the target has increased. In such scenario the service provided on that target cell may be worse/weaker than that on the source cell.

In order to overcome this, it is necessary to instill the UE (100) with some intelligence in decision making towards CHO execution. This can be done by introducing the requirement for satisfying multiple reporting configurations by the UE (100). For example, the UE (100) may be configured with event A3 with trigger quantity set to RSRP. When A3 is successfully satisfied by the UE (100), it is aware that the signal strength of the neighbor cell is better than the serving cell/suitable to serve the UE (100). However, it is not aware of the load and quality of the neighbor cell. To make the UE (100) capable of making an intelligent evaluation of the target cell, the base station (200) can configure event A4 with trigger quantity set to RSRQ. The RSRQ measurement provides an indication of the load on the target cell. Together, the RSRP based A3 indicates that the target cell signal conditions are good and RSRQ based A4 indicates the load on the target cell is acceptable. Therefore, the handover is not made more reliable than the case of the CHO execution based on single condition/trigger.

In another example, in a regular handover, the source cell has several options to decide on handover (based on different reporting configurations and different trigger quantities).
  a. A UE assisted handover based on A3/A5 where the stronger neighbour is indicated in the MR, or
  b. A UE assisted handover based on A4 where neighbour is indicated in MR. However, the source cell may still be in sustainable signal conditions (or the entry condition of A3/A5 may not be satisfied).
  c. Blind HO based on A2 where neighbour is not indicated in the MR.
  d. UE assisted handover based on multiple or sequence of measurement reports from the UE (100) (for different reporting configurations)

To manage and assist in HO decision, the source cell may configure multiple measurement report configurations for the same MO and eventually take decision based on the MR it receives from the UE (100). The MR does not always have to be A3/A5 but can also be A2/A4. In the above example, Beam Failure Recovery (BFR) was indicated as one of the possible outcomes of sudden degradation of the cell (in FR2). The typical values of time-to-trigger (TTT) configured in LTE deployments used to vary between 256 ms to 1024 ms. If BFR is triggered due to sudden drop in beam quality in mobility scenarios, considering that PRACH resource is configured every 10 ms (including time for monitoring RAR), a new RA preamble is transmitted every 10 ms if RAR is not received. Based on the preambleTransMax, the RA failure may occur before TTT is completed and may lead to RLF even in CHO configured cases.

The above examples are only for illustration purposes and the application is not limited to the illustration. This combination of report configuration for CHO evaluation can be done in any combination or same/different reporting configuration with same/different trigger quantities, same/different RS-types etc. In an embodiment, the base station (200) can configure multiple CHO conditions to the UE.

As shown in the FIG. 4*b*, at S402*b*, the UE (100) sends the measurement report to the SgNB (300). At S404*b*, based on the measurement report, the SgNB (300) sends the handover request for CHO to the TgNB1 (400*a*). Based on the handover request, at S406*b*, the TgNB1 (400*a*) performs the admission control procedure. Based on the admission control procedure, at S408*b*, the TgNB1 (400*a*) sends the handover request acknowledge message to the SgNB (300). At S410*b*, the SgNB (300) sends the CHO configuration to the UE (100) and at S412*b*, the UE (100) performs the CHO candidate evaluation. At S414*b*, the UE (100) sends the MR indicting Normal HO to TgNB-2 (400*b*) through the SgNB (300).

At S416*b*, the SgNB (300) sends the handover request for normal HO to the TgNB2 (400*b*). At S418*b*, the UE (100) sends the MR indicting CHO execution to the TgNB-1 (400*a*) through the SgNB (300). Based on the handover request, at S420*b*, the TgNB2 (400*b*) performs the admission control procedure. Based on the admission control procedure, at S422*b*, the TgNB2 (400*b*) sends the handover request acknowledge message to the SgNB (300).

At S424*b*, the SgNB (300) sends the normal HO command to the UE (100) and S426*b*, in the SgNB (300), the normal HO execution indication received first and CHO indication from the UE (100) is ignored. At 430*b*, the UE (100) detaches from the source cell and tune to target cell. At S428*b*, the SgNB (300) sends the SN status transfer message to the TgNB1 (400*a*) and at 432*b*, the SgNB (300) sends the data forwarding to the TgNB1 (400*a*). At S434*b*, the RAN handover completion is occurred between the UE (100) and the TgNB1 (400*a*). At S436*b*, the TgNB1 (400*a*) sends the path switch request to the CN (500). At S438*b*, the CN (500) sends the path switch request acknowledge message to the TgNB (400). At S440*b*, the TgNB1 (400*a*) sends the UE context release to the SgNB (300).

FIG. 5 illustrates the base station (200) may configure the UE (100) with a 1 bit indication (multiple ConditionTrigger) along with the CHO condition configuration to provide the UE (100) with more freedom in decision making, according to the embodiments as disclosed herein. To provide the UE (100) with more judicious control in decision making, the base station (200) may configure the UE (100) with a 1 bit indication (multipleConditionTrigger in the FIG. 5) along with the CHO condition configuration. If the indication is configured in CHO configuration, then it means that there are multiple reporting configurations provided CHO is executed only if all the reporting configurations are satisfied. If the field is absent, it either means that only one reporting configuration is provided, or that multiple reporting condition is provided but CHO can be executed if any of the configured report configurations are satisfied. FIG. 5 also illustrates that the network is configuring the UE with multiple CHO conditions to enable the UE to evaluate candidate target cells for execution CHO.

FIG. 6 illustrates a sequence diagram in which the source cell continues to serve the UE (100) even after providing handover command, until the expiry of timer at the source cell that is equivalent to T304 timer configure to the UE (100) for handover, or on the event of receiving UE CONTEXT RELEASE message from target cell on successful completion of path switch, according to the embodiments as disclosed herein.

As shown in the FIG. 6, at S602, the UE (100) sends the measurement report to the SgNB (300). At S604, based on the measurement report, the SgNB (300) sends the handover request to the TgNB (400). Based on the handover request, at S606, the TgNB (400) performs the admission control procedure. Based on the admission control procedure, at S608, the TgNB (400) sends the handover request acknowledge message to the SgNB (300). After receiving the handover request acknowledge message from the TgNB (400), at S610, the SgNB (300) sends the HO Command/Reconfig with sync message to the UE (100). Based on the HO Command/Reconfig with sync message, at S312a, the UE (100) continues on the source cell and tune to target cell. At S614, the SgNB (300) continues the data path to the UE (100) and starts timer T304.

At S616, the SgNB (300) sends the SN status transfer message to the TgNB (400) and at S618, the SgNB (300) sends the data forwarding to the TgNB (400). At S620, the RAN handover completion is occurred between the UE (100) and the TgNB (400). At S622, the TgNB (400) sends the path switch request to the CN (500). At S624, the CN (500) sends the path switch request acknowledge message to the TgNB (400). At S626, the TgNB (400) sends the UE context release to the SgNB (300).

In an embodiment, the method can be used to identify condition to stop transmission on source cell during an eMBB based handover. In release 14 make before break handover in LTE, the UE (100) continues to receive on the source cell even after receiving handover command from the base station (200). However, the base station (200) is unaware of the time until which the UE (100) continues monitoring DL channels from source cell. This is because the UE (100) is assumed to have a single receive chain (single Rx) and cannot receive from both source and target at the same time. Therefore, it is not possible for source to correctly estimate the time it takes for the UE (100) to tune to the target cell and perform random access. As a result, the time till which the UE (100) receives data from source cell and the time until which the source continues DL transmission are left to implementation.

In release 16, both LTE and NR are working towards an enhancement to the MBB procedure where the UE (100) is expected to have 2 receive chains. Therefore, it is possible for the UE (100) to receive from both source cell and target cell at the same time. As a result, it is possible for the source to continue transmission on the source cell and for the UE (100) to receive on the source cell till successful access to the target cell. Therefore it is possible to correctly identify when the source cell can stop transmission to the UE (100). One way is for the UE (100) to indicate to the source cell via MAC CE or other uplink signaling methods when the UE (100) releases source cell connection and performs actions only on target cell. However, this method is not reliable as the signal condition to the source cell is expected to be very poor and the probability of successfully sending indication to source cell is very small.

Another way to indicate release of the source cell, is for the target cell to indicate to the source cell once the UE (100) has successfully accessed the target cell (handover completion on the target cell). However, this method can be lead to a delay in indicating to the source cell with the added overhead of introducing a new signaling from the target cell to the source cell requesting source to suspend activity from the source cell.

In another embodiment, the method can be used for the source cell to continue activity after providing handover command to the UE (100), till the expiry of a timer or occurrence of an event. In an embodiment, the source cell continues to serve the UE (100) even after providing handover command, until the expiry of timer at the source cell that is equivalent to T304 timer configure to the UE (100) for handover, or on the event of receiving UE CONTEXT RELEASE message from the target cell on successful completion of path switch. This is illustrated if FIG. 6. In another embodiment, the source cell may continue serving the UE (100) until a portion of T304 timer.

In an embodiment, the method can be used to indicate the Beam ID in accessibility measurements in a logged Minimization of driving test (MDT). In LTE, the accessibility measurement contains number of preambles sent during the failed connection establishment attempt and the location information among other parameters. In a beamformed system like NR, it is possible that the UE (100) is in coverage of more than one beam. The UE (100) selects a beam for random access based on the threshold configured in a system information. Therefore, different UEs in same location receiving signal from the same set of beams may attempt connection establishment based on PRACH resources associated to different beams. As a result, to correctly evaluate the resources used when the UE (100) encountered connection establishment failure, the UE (100) needs to indicate the SSB which it selected to access the cell. In an embodiment, the SSB ID on which the UE (100) encountered connection establishment failure is indicated to the base station (200) in accessibility measurement as given below:

```
ConnEstFailReportNR ::=     SEQUENCE {
    failedCellId               CellIdNR,
    locationInfo               LocationInfo-r10            OPTIONAL,
    measResultFailedCell       SEQUENCE {
        rsrpResult                 RSRP-Range,
        rsrqResult                 RSRQ-Range,
        sinrResult                 SINR-Range              OPTIONAL
    },
    measResultNeighCells       SEQUENCE {
        measResultListNR           MeasResultListNR        OPTIONAL,
        measResultListEUTRA        MeasResultList2EUTRA    OPTIONAL,
    } OPTIONAL,
```

```
numberOfPreamblesSent      NumberOfPreamblesSent
contentionDetected         BOOLEAN,
maxTxPowerReached          BOOLEAN,
timeSinceFailure           TimeSinceFailure,
measResultListNR           MeasResultListNR          OPTIONAL,
measResultFailedCell       RSRQ-Range                OPTIONAL,
failedCellRSRQ-Type        RSRQ-Type-r12             OPTIONAL,
  SSBid                      SSB-Index,
}
```

In the LTE, the accessibility measurement contains number of preambles sent during the failed connection establishment attempt and the location information among other parameters, and the same can be reused for NR resume failure report. In the beamformed system like NR, it is possible that the UE (100) is in coverage of more than one beam. The UE (100) selects a beam for random access based on the threshold configured in the system information. Therefore, different UEs in same location receiving signal from the same set of beams may attempt connection resume based on PRACH resources associated to different beams. As a result, to correctly evaluate the resources used when the UE (100) encountered connection resume failure, the UE (100) needs to indicate the SSB which it selected to access the cell. In another embodiment, the SSB id on which the UE (100) encountered connection resume failure is indicated to the base station (200) in accessibility measurement as given below:

```
ConnResumeFailReportNR ::=    SEQUENCE {
  failedCellId                CellIdNR,
  locationInfo                LocationInfo-r10          OPTIONAL,
  measResultFailedCell        SEQUENCE {
    rsrpResult                  RSRP-Range,
    rsrqResult                  RSRQ-Range,
    sinrResult                  SINR-Range              OPTIONAL
  },
  measResultNeighCells        SEQUENCE {
    measResultListNR            MeasResultListNR        OPTIONAL,
    measResultListEUTRA         MeasResultList2EUTRA    OPTIONAL,
  } OPTIONAL,
  numberOfPreamblesSent       NumberOfPreamblesSent
  contentionDetected          BOOLEAN,
  maxTxPowerReached           BOOLEAN,
  timeSinceFailure            TimeSinceFailure,
  measResultListNR            MeasResultListNR          OPTIONAL,
  measResultFailedCell        RSRQ-Range                OPTIONAL,
  failedCellRSRQ-Type         RSRQ-Type-r12             OPTIONAL,
    SSBid                       SSB-Index,
}
```

In another embodiment, the method can be used to indicate UL carrier id in accessibility measurements in logged MDT. Unlike LTE, the NR can have 2 uplink carriers (normal UL and SUL) configured for accessing the cell. Therefore, random access for connection establishment may be performed either on normal UL or SUL PRACH resources. The carrier on which RACH is performed is dependent on the DL pathloss reference. As a result, not all the UEs in the same location may perform RACH on the same UL carrier owing to RF performance and channel variations. Therefore, to correctly evaluate the resources used when the UE (100) encountered connection establishment failure, the UE (100) needs to indicate the UL carrier it selected to access the cell. In an embodiment, the uplink carrier on which the UE (100) encountered connection establishment failure is indicated to base station (200) in accessibility measurements:

```
ConnEstFailReportNR ::=       SEQUENCE {
  failedCellId                CellIdNR,
  locationInfo                LocationInfo-r10          OPTIONAL,
  measResultFailedCell        SEQUENCE {
    rsrpResult                  RSRP-Range,
    rsrqResult                  RSRQ-Range,
    sinrResult                  SINR-Range              OPTIONAL
```

```
},
measResultNeighCells         SEQUENCE {
   measResultListNR              MeasResultListNR        OPTIONAL,
   measResultListEUTRA           MeasResultList2EUTRA    OPTIONAL,
} OPTIONAL,
numberOfPreamblesSent        NumberOfPreamblesSent
contentionDetected           BOOLEAN,
maxTxPowerReached            BOOLEAN,
timeSinceFailure             TimeSinceFailure,
measResultListNR             MeasResultListNR           OPTIONAL,
measResultFailedCell         RSRQ-Range                 OPTIONAL,
failedCellRSRQ-Type          RSRQ-Type-r12              OPTIONAL,
   ulCarrierIndex                ULCarrierIndex,
}
ULCarrierIndex ::=           ENUMERATED {NormalUL, SUL}
```

Unlike LTE, NR can have 2 uplink carriers (normal UL and SUL) configured for accessing the cell. Therefore, random access for connection resume may be performed either on normal UL or SUL PRACH resources. The carrier on which RACH is performed is dependent on the DL pathloss reference. As a result, not all the UEs in the same location may perform RACH on the same UL carrier owing to RF performance and channel variations. Therefore, to correctly evaluate the resources used when the UE (100) encountered connection resume failure, the UE (100) needs to indicate the UL carrier it selected to access the cell. In another embodiment, the uplink carrier on which the UE (100) encountered connection resume failure is indicated to base station (200) in the accessibility measurements:

```
ConnResumeFailReportNR ::=   SEQUENCE {
failedCellId                 CellIdNR,
locationInfo                 LocationInfo-r10           OPTIONAL,
measResultFailedCell         SEQUENCE {
   rsrpResult                    RSRP-Range,
   rsrqResult                    RSRQ-Range,
   sinrResult                    SINR-Range              OPTIONAL
},
measResultNeighCells         SEQUENCE {
   measResultListNR              MeasResultListNR        OPTIONAL,
   measResultListEUTRA           MeasResultList2EUTRA    OPTIONAL,
} OPTIONAL,
numberOfPreamblesSent        NumberOfPreamblesSent
contentionDetected           BOOLEAN,
maxTxPowerReached            BOOLEAN,
timeSinceFailure             TimeSinceFailure,
measResultListNR             MeasResultListNR           OPTIONAL,
measResultFailedCell         RSRQ-Range                 OPTIONAL,
failedCellRSRQ-Type          RSRQ-Type-r12              OPTIONAL,
   ulCarrierIndex                ULCarrierIndex,
}
ULCarrierIndex ::=           ENUMERATED {NormalUL, SUL}
```

In another embodiment, the method can be used to indicate the UE capability to support different enhanced mobility procedures for handover. There are multiple ways in which mobility interruption time can be reduced based on a make before break type of handover. It is possible that the UE (100) support more than one type of MBB/enhanced MBB based handover depending on the scenario and UE capability. Therefore, it is required for the UE (100) to indicate to the base station (200) about its capability and supported ways of performing MBB based handover. This has to be indicated as part of UE capability. In an embodiment, the UE (100) possess the capability to support either one of single stack based enhanced MBB HO or a dual stack based enhanced MBB HO or both.

In a single stack based mobile broadband (MBB) solution, only one protocol stack is fully activated at a given time and other protocol stack is not fully activated. For example, on receiving single stack based eMBB handover command from the base station (200), the UE (100) maintains the full stack on source cell and continues operation on source until a particular time. During this time, the target stack may be partially active or not active at all based on UE capability. Once the access to the target cell has been successful, the UE (100) releases the source cell associated protocol stack and functions using only the protocol stack associated to the target.

In a dual stack based MBB solution, the UE (100) can have the protocol stack associated with source cell and the protocol stack associated to the target cell active at the same time. The two stacks are simultaneously active only for a short duration to facilitate transition of resources/packets from source cell to target cell. An illustration of UE capability indicating support of mobility type is provided below:

```
MeasAndMobParameters ::=              SEQUENCE {
    measAndMobParametersCommon            MeasAndMobParametersCommon       OPTIONAL,
    measAndMobParametersXDD-Diff          MeasAndMobParametersXDD-Diff     OPTIONAL,
    measAndMobParametersFRX-Diff          MeasAndMobParametersFRX-Diff     OPTIONAL
}
MeasAndMobParametersCommon ::=        SEQUENCE {
    supportedGapPattern                   BIT STRING (SIZE (22))           OPTIONAL,
    ssb-RLM                               ENUMERATED {supported}           OPTIONAL,
    ssb-AndCSI-RS-RLM                     ENUMERATED {supported}           OPTIONAL,
    ...,
    [[
    eventB-MeasAndReport                  ENUMERATED {supported}   OPTIONAL,
    handoverFDD-TDD                       ENUMERATED {supported}   OPTIONAL,
    eutra-CGI-Reporting                   ENUMERATED {supported}   OPTIONAL,
    nr-CGI-Reporting                      ENUMERATED {supported}   OPTIONAL
    ]],
    [[
    independentGapConfig                  ENUMERATED {supported}                       OPTIONAL,
    periodicEUTRA-MeasAndReport           ENUMERATED {supported}                       OPTIONAL,
    handoverFR1-FR2                       ENUMERATED {supported}                       OPTIONAL,
    maxNumberCSI-RS-RRM-RS-SINR           ENUMERATED {n4, n8, n16, n32, n64, n96}      OPTIONAL
    ]],
    [[
    nr-CGI-Reporting-ENDC                 ENUMERATED {supported}   OPTIONAL
    ]],
    [[
    enhancedMBBSupport-R16   ENUMERATED {singleStack, dualStack, both}     OPTIONAL
    ]]
}
```

In another embodiment, the method can be used to indicate the MBB type UE should apply for the configured handover. As the UE (100) can support more than one type of MBB based handover—namely single stack and dual stack based MBB HO—it is required that the UE (100) is indicated on the type of handover that has to be performed when reconfiguration with sync is provided to it. Therefore, the base station (200) provides the MBB type that needs to be used for the current handover based on several factors, which may include UE capability, interruption requirement for the ongoing service, deployment scenario etc. In an embodiment, the serving PCell indicates to the UE (100) about the type of MBB it has to apply for the current handover.

This indication can be provided as part of reconfiguration with sync in several ways. One way is to always provide the mobility type in reconfig with sync/handover command. This indication would explicitly inform the UE (100) of the type of MBB it needs to apply as illustrated below:

```
ReconfigurationWithSync ::=    SEQUENCE {
    spCellConfigCommon             ServingCellConfigCommon
OPTIONAL,  -- Need M
    newUE-Identity                 RNTI-Value,
    t304                           ENUMERATED {ms50, ms100, ms150, ms200, ms500,
ms1000, ms2000, ms10000},
    rach-ConfigDedicated           CHOICE {
        uplink                         RACH-ConfigDedicated,
        supplementaryUplink            RACH-ConfigDedicated
    }
OPTIONAL,  -- Need N
    ...,
    [[
    smtc                           SSB-MTC
OPTIONAL   -- Need S
    ]],
    [[
    enhancedMbbType-r16   ENUMERATED {singleStack, dualStack}   OPTIONAL Need N
    ]]
}
```

In another embodiment, the method can optionally include the indication where, if included the handover has to be dual stack based MBB HO, and the single stack based MBB HO if the indication is not included (or vice versa) as illustrated below:

```
ReconfigurationWithSync ::=   SEQUENCE {
    spCellConfigCommon           ServingCellConfigCommon
OPTIONAL,   -- Need M
    newUE-Identity               RNTI-Value,
    t304                         ENUMERATED {ms50, ms100, ms150, ms200, ms500,
ms1000, ms2000, ms10000},
    rach-ConfigDedicated         CHOICE {
        uplink                       RACH-ConfigDedicated,
        supplementaryUplink          RACH-ConfigDedicated
    }
OPTIONAL,   -- Need N
    ...,
    [[
    smtc                         SSB-MTC
OPTIONAL   -- Need S
    ]],
    [[
    enhancedMbbType-r16   ENUMERATED {dualStack} OPTIONAL Need N
    ]]
}
```

The embodiments herein are applicable for LTE, NR and other cellular communication technologies and the reference to any one of these technologies in the invention is only for the purpose of illustration and not restricted by it.

The embodiments disclosed herein can be implemented using at least one software program running on at least one hardware device and performing network management functions to control the elements.

The various actions, acts, blocks, steps, or the like in the flow chart (S200a and S200b) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
receiving a first message configuring a reconfiguration with synchronization, the first message including information related with a dual stack based handover;
identifying a failure of establishing a radio resource control (RRC) connection for the dual stack based handover;
generating first information including a synchronization signal block (SSB) index associated with a random access performed for the RRC connection, second information associated with an uplink carrier for the random access performed for the RRC connection, and third information indicating whether a contention was detected in the random access or not; and
transmitting, to a base station, a second message for reporting the failure of establishing the RRC connection, the second message including the first information, the second information, and the third information.

2. The method of claim 1, wherein the uplink carrier includes a normal uplink (NUL) carrier or a supplementary uplink (SUL) carrier.

3. The method of claim 1, wherein the failure includes an RRC connection establishment failure.

4. The method of claim 1, further comprising:
receiving, from the base station, a third message for requesting a report of the failure of establishing the RRC connection,
wherein the second message for the reporting the failure is transmitted in response to receiving the third message for requesting the report of the failure.

5. A method performed by a base station in a wireless communication system, the method comprising:
transmitting, to a user equipment (UE), a first message configuring a reconfiguration with synchronization, the first message including information related with a dual stack based handover;
receiving, from the UE, a second message for reporting a failure of establishing a radio resource control (RRC) connection for the dual stack based handover; and
identifying the failure of establishing the RRC connection, based on first information, second information, and third information included in the second message,
wherein the first information includes a synchronization signal block (SSB) index associated with a random access performed for the RRC connection,
wherein the second information is associated with an uplink carrier for the random access performed for the RRC connection, and
wherein the third information indicates whether a contention was detected in the random access or not.

6. The method of claim 5, wherein the uplink carrier includes a normal uplink (NUL) carrier or a supplementary uplink (SUL) carrier.

7. The method of claim 5,
wherein the failure (RLF) includes an RRC connection establishment failure.

8. The method of claim 5, further comprising:
transmitting, to the UE, a third message for requesting a report of the failure of establishing the RRC connection,
wherein the second message for the reporting the failure is received in response to transmitting the third message for requesting the report of the failure.

9. A user equipment (UE) in a wireless communication system, the UE comprising:
a transceiver; and
at least one processor coupled with the transceiver and configured to:
receive a first message configuring a reconfiguration with synchronization, the first message including information related with a dual stack based handover,
identify a failure of establishing a radio resource control (RRC) connection for the dual stack based handover,
generate first information including a synchronization signal block (SSB) index associated with a random access performed for the RRC connection, second information associated with an uplink carrier for the random access performed for the RRC connection, and third information indicating whether a contention was detected in the random access or not, and
transmit, to a base station, a second message for reporting the failure of establishing the RRC connection, the second message including the first information, the second information, and the third information beam.

10. The UE of claim 9,
wherein the uplink carrier includes a normal uplink (NUL) carrier or a supplementary uplink (SUL) carrier.

11. The UE of claim 9, wherein the failure includes an RRC connection establishment failure.

12. The UE of claim 9, wherein the at least one processor is further configured to:
receive, from the base station, a third message for requesting a report of the failure of establishing the RRC connection,
wherein the second message for the reporting the failure is transmitted in response to receiving the third message for requesting the report of the failure.

13. A base station in a wireless communication system, the base station comprising:
a transceiver; and
at least one processor coupled with the transceiver and configured to:
transmit, to a user equipment (UE), a first message configuring a reconfiguration with synchronization, the first message including information related with a dual stack based handover,
receive, from the UE, a second message for reporting a failure of establishing a radio resource control (RRC) connection for the dual stack based handover, and
identify the failure of establishing the RRC connection, based on first information, second information, and third information included in the second message,
wherein the first information includes a synchronization signal block (SSB) index associated with a random access performed for the RRC connection,
wherein the second information is associated with an uplink carrier for the random access performed for the RRC connection, and
wherein the third information indicates whether a contention was detected in the random access or not.

14. The base station of claim 13, wherein the uplink carrier includes a normal uplink (NUL) carrier or a supplementary uplink (SUL) carrier.

15. The base station of claim 13, wherein the failure includes an RRC connection establishment failure.

16. The base station of claim 13, wherein the at least one processor is further configured to:
transmit, to the UE, a third message for requesting a report of the failure of establishing the RRC connection,
wherein the second message for the reporting the failure is received in response to transmitting the third message for requesting the report of the failure.

* * * * *